R. R. GASKILL.
Stalk-Chopper.
No. 55,848. Patented June 26, 1866.
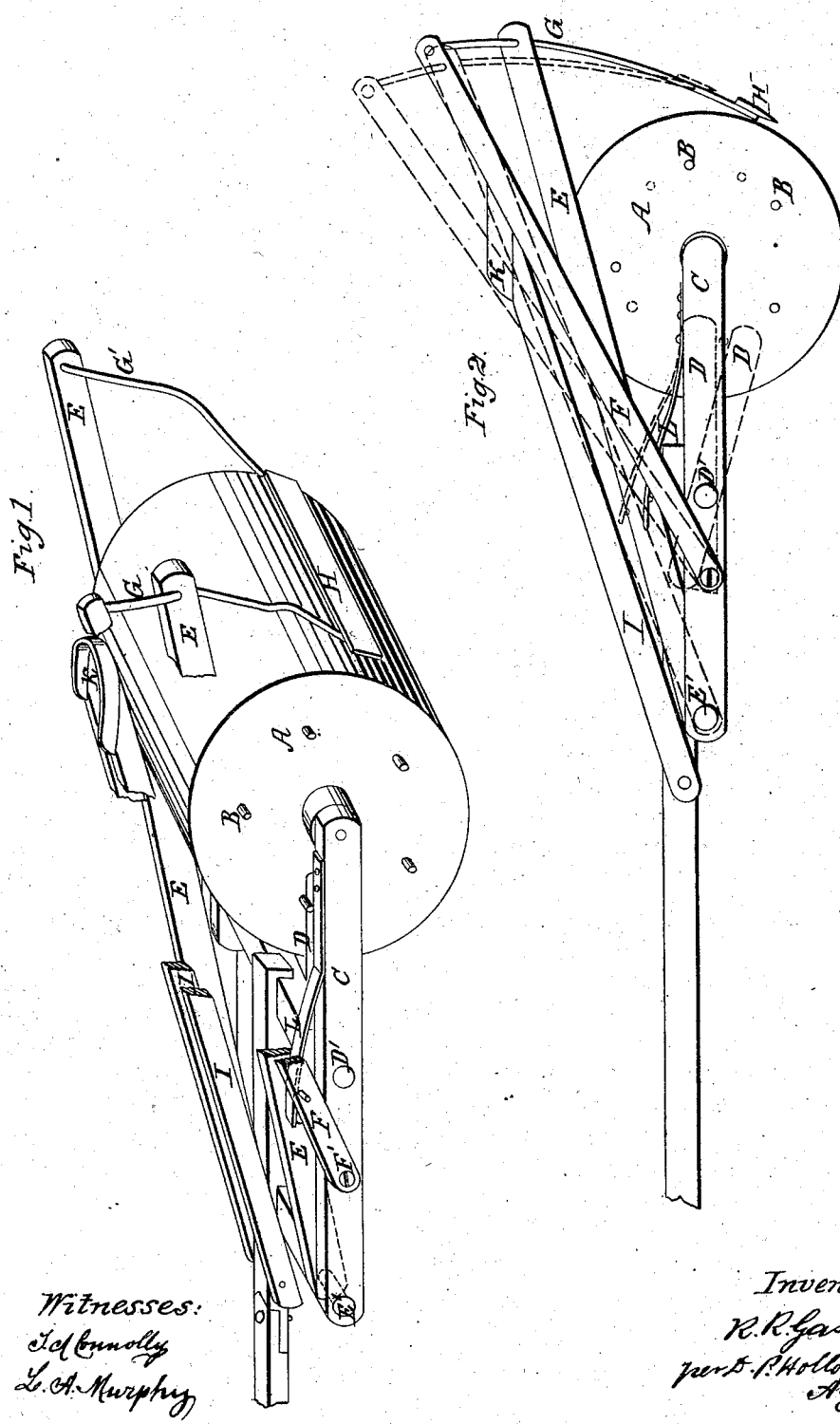

UNITED STATES PATENT OFFICE.

ROLAND R. GASKILL, OF MENDOTA, ILLINOIS.

IMPROVEMENT IN ROLLER AND CORN-STALK CUTTER.

Specification forming part of Letters Patent No. 55,848, dated June 26, 1866.

*To all whom it may concern:*

Be it known that I, ROLAND R. GASKILL, of Mendota, in the county of La Salle and State of Illinois, have invented a new and useful Improvement in Stalk-Cutters; and I do hereby declare that the following is a full, clear, and exact description of the same, reference being had to the annexed drawings, made part of this specification, in which—

Figure 1 is a perspective view; and Fig. 2 is a side elevation, in which the movement of the levers is shown in red lines.

The same letters refer to identical parts.

The object of my improvement is to provide a machine that may be employed as a roller for all purposes to which a roller is applicable, and which is also provided with a knife, that may be attached when desired, to be used for cutting into short pieces stalks of corn, cotton, or other products, so as to clear the ground for plowing.

A is a large roller, such as is ordinarily employed in agriculture, having a series of projecting pins, B, at equal distances from the center, inserted in each end. C is the main frame, composed of four pieces of timber—two side pieces, to which the roller is attached by journals, leaving room for the pins B to clear the sides, an end piece, and a brace uniting the side pieces at points marked E' and D'. The tongue is attached to the latter.

On the inner faces of the side pieces of the frame are levers D, pivoted on the brace of the frame at D'. The long ends of these levers are extended so far toward the journals of the rollers as to be carried down by the pins B. The short ends operate on the under side of the levers E, which are pivoted on the front piece of the main frame at E' and extend back in rear of and higher than the roller A. These levers rest, by pins inserted in their sides, upon springs L on the sides of the main frame.

Rods G G' are hinged to the rear extremities of the levers E. These rods are carried downward and attached to the ends of a knife, H, which is placed parallel with the face of the roller A. The rod G is bent into the form of a crank where it passes through the lever E, and is extended upward, being again bent like a crank and hinged to an arm, F, pivoted at F' to the side of the main frame between the points of attachment D' and E', already referred to. This arm is necessarily attached on the outside of the frame.

I I are timbers attached to tongue by a bolt and supporting the driver's seat K.

In operating with this machine, the levers may be all detached and the main frame and roller only be used; or, when desired, it may be also used as a stalk-cutter. The pins B, with the revolution of the roller acting upon the levers D, raise the levers E, and with them the knife H. When the pins disengage the levers D the knife falls with considerable force upon the stalks, which are pressed down upon the earth by the roller, cutting them into short pieces. The arm F, turning with a shorter radius than the levers E, draws the knife away from the roller when rising, and causes it to approach on descending.

Having fully explained the construction of the machine, what I claim as my invention, and seek to secure by Letters Patent, is—

1. The combination of the roller A and knife H, the two being so connected by intermediate mechanism as that the knife shall fall with the forward movement of the roller, substantially as and for the purpose set forth.

2. The combination of the knife H, rods G and G', and lever E, and arm F, substantially as and for the purpose set forth.

3. The roller A, with pins B, in combination with the levers D and E and knife H, substantially as and for the purpose set forth.

In testimony whereof I have signed my name to this specification in the presence of two subscribing witnesses.

ROLAND R. GASKILL.

Witnesses:
L. B. CROOKER,
R. J. McINTYRE.